US007689715B1

(12) United States Patent
Slaughter et al.

(10) Patent No.: US 7,689,715 B1
(45) Date of Patent: Mar. 30, 2010

(54) METHOD AND SYSTEM FOR IMPLEMENTING A GLOBAL NAME SPACE SERVICE

(75) Inventors: Gregory L. Slaughter, Palo Alto, CA (US); Paul Czarnik, Danville, CA (US); John Muth, Scotts Valley, CA (US); Kai Wong, Saratoga, CA (US); Andrew Krumel, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1209 days.

(21) Appl. No.: 10/327,544

(22) Filed: Dec. 20, 2002
(Under 37 CFR 1.47)

(51) Int. Cl.
*G06F 15/16* (2006.01)

(52) U.S. Cl. .................. 709/245; 709/212; 709/213; 709/214; 709/215; 709/216; 709/226; 709/227; 709/201; 709/228; 707/10

(58) Field of Classification Search ......... 709/212–216, 709/227–229, 245, 201; 707/10
See application file for complete search history.

(56) References Cited

U.S. PATENT DOCUMENTS

| 5,483,652 | A | | 1/1996 | Sudama et al. |
| 5,572,709 | A | * | 11/1996 | Fowler et al. ............. 703/27 |
| 5,689,706 | A | * | 11/1997 | Rao et al. .................. 707/201 |
| 5,909,540 | A | * | 6/1999 | Carter et al. ............... 714/4 |
| 6,047,332 | A | * | 4/2000 | Viswanathan et al. ....... 709/245 |
| 6,546,415 | B1 | | 4/2003 | Park |
| 6,625,604 | B2 | | 9/2003 | Muntz et al. |
| 6,836,775 | B2 | * | 12/2004 | Anderson et al. ........... 707/10 |
| 6,892,245 | B1 | * | 5/2005 | Crump et al. .............. 709/245 |
| 7,024,427 | B2 | * | 4/2006 | Bobbitt et al. ............. 707/200 |
| 7,149,750 | B2 | * | 12/2006 | Chadwick .............. 707/103 R |
| 7,548,946 | B1 | * | 6/2009 | Saulpaugh et al. ......... 709/203 |
| 2002/0184311 | A1 | | 12/2002 | Traversat et al. |

OTHER PUBLICATIONS

Traversat, et al, "Project JXTA Virtual Network", Feb. 5, 2002, http://www.jxta.org/docs/JXTAprotocols.pdf.

* cited by examiner

*Primary Examiner*—Nathan Flynn
*Assistant Examiner*—Mohammad A Siddiqi
(74) *Attorney, Agent, or Firm*—Moser IP Law Group

(57) ABSTRACT

A method and system for implementing a global name space service. The method may include receiving a file system unique identifier corresponding to a particular file and a human-readable name corresponding to the same file. The method may further include binding the human-readable name to the file system unique identifier, thereby creating a mapping between the human-readable name and the file system unique identifier. The system may include a processor coupled to a memory and to a global name space service manager. The global name space service manager may be configured to receive a file system unique identifier corresponding to a particular file and a human-readable name corresponding to the same file. The global name space service manager may be further configured to bind the human-readable name to the file system unique identifier, thereby creating a mapping between the human-readable name and the file system unique identifier.

17 Claims, 7 Drawing Sheets

METHOD AND SYSTEM FOR IMPLEMENTING A GLOBAL NAME SPACE SERVICE

BACKGROUND OF THE INVENTION

1. Field of the Invention This invention relates to distributed file systems and, more particularly, to file mapping conventions used in distributed file systems and distributed file sharing systems.

2. Description of the Related Art

Computer systems generally store files on one or more storage systems such a disk drive. To access these files, a file system is used. The type of file system is typically dependent on the operating system running on a given computer system, although file system software is available which may run in conjunction with any operating system.

Although each type of file system may have a its own way of identifying the location of a given file, the file systems may be similar. For example, file systems are typically arranged in a hierarchy. To describe a specific location in the file system hierarchy, a pathname is typically specified using a hierarchical structure staring at a root directory. In the file system associated with the UNIX operating system, forward slashes '/' may be used to identify different levels of the hierarchy, while in the file system associated with the Windows™ operating system back slashes '\' may be used. The root directory may be identified by the first slash in a pathname. To illustrate, /a/b/c is a pathname in the UNIX operating system, while \a\b\c may be a pathname in the Windows™ operating system. The file naming convention used above indicates that the 'a' is the name of a directory under the root, the 'b' is a directory name under the 'a' directory and the 'c' is the name of some file under the 'b' directory. The names are human-readable names. However, the operating system treats the file system structure differently. For example in the UNIX file system, one of four types of items are defined: ordinary files, directories, special files and links.

An ordinary file may contain text, data or program information. An ordinary file may not contain another file or directory. A special file may represent an input/output (i/o) device, such as a printer of terminal, for example. A link is a pointer to another file. A directory is a file containing an entry line for each item in the directory, where each line includes a name and an i-number. An i-number is a numerical reference to the location of the item. The i-number serves as an index into an i-list, which is a complete list of all the storage space available to the file system.

A single i-list refers to an area of physical memory. A UNIX machine may be connected to several file systems, each with its own i-list. The purpose of an i-list is to provide the operating system with a map into the memory of some physical storage device. Each entry in an i-list is referred to as an inode. The modes contain the information necessary to get information from the storage device. The i-list is typically stored on the same memory storage device that it maps. This means that the directory files associated with a pathname are located on the same machine.

The convention described above may work well in certain systems having centralized servers. However, they may not work as well when applied to a distributed file system in which files may be stored in a location-independent network environment and accessed from any machine in the network, particularly in computer systems using a decentralized network.

SUMMARY OF THE INVENTION

Various embodiments of a method and system for implementing a global name space service are disclosed. In one embodiment, the method may include receiving a file system unique identifier corresponding to a particular file and a human-readable name corresponding to the same file. The method may further include binding the human-readable name to the file system unique identifier, thereby creating a mapping between the human-readable name and the file system unique identifier.

In another embodiment, the system includes a plurality of nodes interconnected via a network. Each of the nodes may include a processor configured to execute program instructions, a memory coupled to the processor and configured to store the program instructions and a global name space service manager coupled to the processor. The global name space service manager may be configured to receive a file system unique identifier corresponding to a particular file and a human-readable name corresponding to the same file. The global name space service manager may be further configured to bind the human-readable name to the file system unique identifier creating a mapping between the human-readable name and the file system unique identifier.

Figure 1:
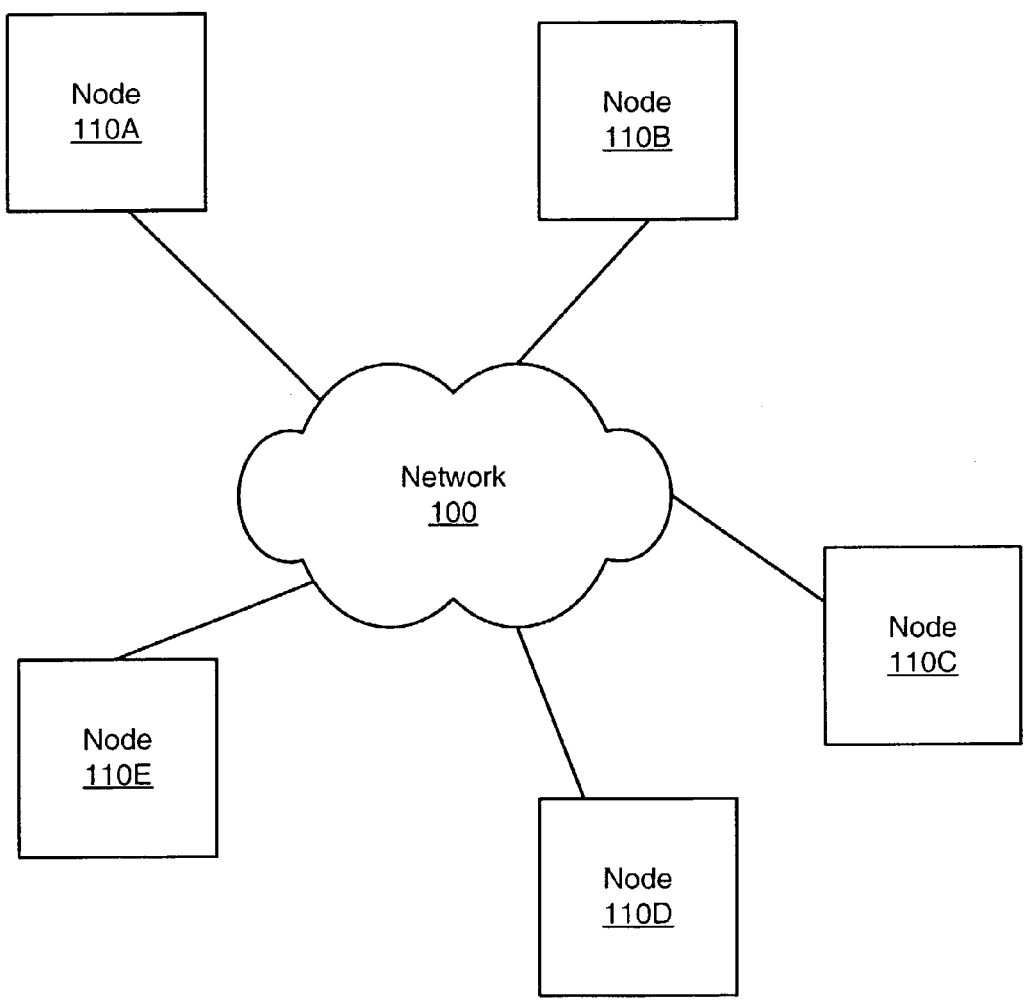
FIG. 1 is a diagram of one embodiment of a network of nodes.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a diagram of one embodiment of a network of nodes is shown. Network 100 includes nodes 110A through 110E. Each of nodes 110A-E may communicate with each other through network 100. For example, in one embodiment network 100 may be a peer-to-peer network, although other embodiments are contemplated in which network 100 may be any type of network. In addition, in one embodiment, a subset of the nodes (e.g., nodes 110A, 110B and 110E) may form a peer-to-peer overlay network (not shown), in which nodes 110A, 110B and 110E communicate with each other. It is noted that throughout this disclosure, drawing features identified by the same reference number followed by a letter (e.g., node 110A-110E) may be collectively referred to by that reference number alone (e.g., node 110) where appropriate. It is further noted that although nodes 110A-110E are shown, other embodiments are contemplated which include other numbers of nodes.

The cloud representing network 100 is representative of any local area network (LAN) such as an intranet or any wide area network (WAN) such as the Internet, for example. Network 100 may use a variety of wired or wireless connection mediums. For example, wired mediums may include: a modem connected to plain old telephone service (POTS), Ethernet and fiber channel. Wireless connection mediums include a satellite link, a modem link through a cellular service or a wireless link such as Wi-Fi™, for example.

As will be described in greater detail below in conjunction with the descriptions of FIG. 2 through FIG. 6, each node 110 may provide storage accessible to the other nodes in the network. Further, each of nodes 110 may include a distributed file system including a global name space service manager for mapping a human-readable name such as a pathname of a file to a unique identifier (UID) for that file. The mapping may be maintained globally allowing any of nodes 110 to access the same file using the human-readable pathname thereby making the file location independent.

Figure 2:
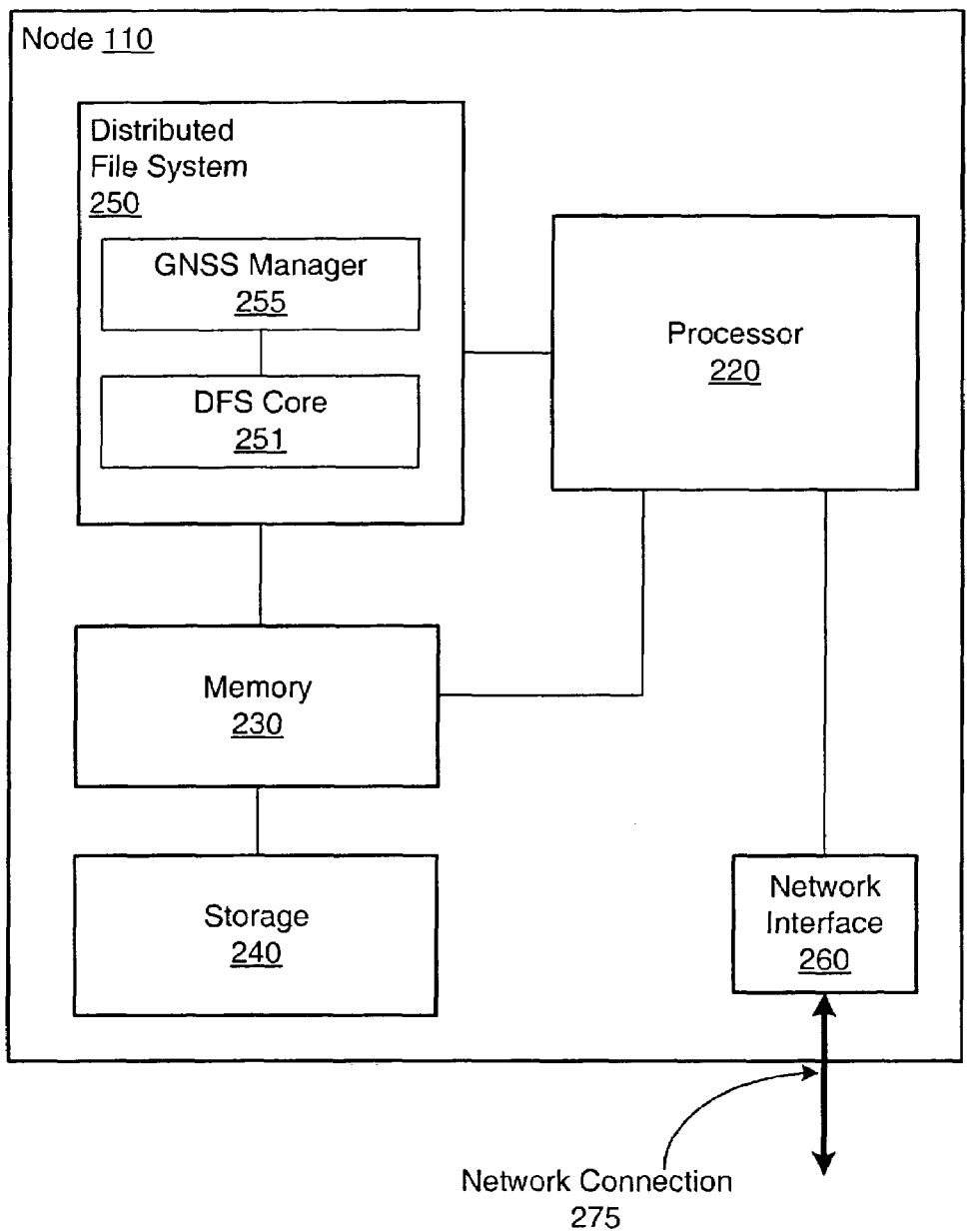
FIG. 2 is a diagram of one embodiment of a network node.

Referring to FIG. 2, a diagram of one embodiment of a node in the network of FIG. 1 is shown. Generally speaking, node 110 may include various hardware and software components. In the illustrated embodiment, node 110 includes a processor 220 coupled to a memory 230 which is in turn coupled to a storage 240. In addition, processor 220 is coupled to a network interface 260. Node 110 may be connected to a network such as network 100 of FIG. 1 via a network connection 275. Further, node 110 includes a distributed file system 250. Distributed file system 250 includes software components executable by processor 220 out of memory 230. The software components of distributed file system 250 include a distributed file system (DFS) core 251 and a global name space service (GNSS) manager 255.

Processor 220 may be configured to execute instructions and to operate on data stored within memory 230. In one embodiment, processor 220 may operate in conjunction with memory 230 in a paged mode, such that frequently used pages of memory may be paged in and out of memory 230 from storage 240 according to conventional techniques. It is noted that processor 220 is representative of any type of processor. For example, in one embodiment, processor 220 may be compatible with the x86 architecture, while in another embodiment processor 220 may be compatible with the SPARC™ family of processors.

Memory 230 is configured to store instructions and data. In one embodiment, memory 230 may be implemented in various forms of random access memory (RAM) such as dynamic RAM (DRAM) or synchronous DRAM (SDRAM). However, it is contemplated that other embodiments may be implemented using other types of suitable memory.

Storage 240 is configured to store instructions and data. Storage 240 may be an example of any type of mass storage device or system. For example, in one embodiment, storage 240 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, storage 240 may include tape drives, optical storage devices or RAM disks, for example. It is noted that in addition to storage 240 being accessible by processor 220 through memory 230, it is contemplated that the contents of storage 240 may be accessible by other nodes in the network via distributed file system 250.

Network interface 260 may implement functionality to connect node 110 to a network such as network 100 of FIG. 1 via network connection 275. For example, network interconnect 260 may include a hardware layer and a software layer which controls the hardware layer. The software may be executable by processor 220 out of memory 230 to implement various network protocols such as TCP/IP and hypertext transport protocol (HTTP), for example.

Distributed file system 250 may implement functionality to control the storage of and access to information within storage 240 of node 110. In addition, distributed file system 250 may implement functionality to provide access to information stored within similar storages 240 within other nodes of network 100. In the illustrated embodiment, DFS core 251 and GNSS manager 255 may support various specific file system functions, as described further below.

In one embodiment, DFS core 251 may include functionality to keep track of files stored within storage 240. DFS core 251 may further provide a file system unique identifier (UID) for each file to be stored. In one embodiment, the UID may be provided in response to an internal DFS core 251 publish function which may notify a routing layer (not shown) within DFS core 251 that a file is about to be stored and needs a UID. This UID may subsequently be used by each DFS core 251 of each node 110 to locate the associated file regardless of which node the file is stored within. Thus, the UID becomes a location-independent reference ID for each file.

In another embodiment, DFS core 251 may include functionality to create a storage object which corresponds to each file to be stored within storage 240. Accordingly, the UID corresponds to the storage object. For simplicity, any reference to a file being stored is equally applicable for a storage object.

In another embodiment, DFS core 251 may include functionality to create multiple storage objects corresponding to each file to be stored within storage 240. In such an embodiment, each UID corresponds to a respective storage object.

In one embodiment, distributed file system 250 defines a global file system hierarchy having a particular name space. As used herein the "name space" refers to the set of names in a naming system. Hence a global name space refers to the name space across the entire global file system which may span all nodes in a given network. For example, distributed file system 250 may use pathnames having the form:

$/p_0/p_1/p_2/ \ldots /p_{n-}/p_n$, where each $p_i$ is a pathname component.

As will be described in greater detail below in conjunction with the description of FIG. 3, GNSS manager 255 is a decentralized service which may implement functionality to map a human-readable name such as a pathname, for example, to the UID provided by DFS core 251. This may allow each other node 110 within network 100 to access the file within storage 240. In addition, during a lookup of a particular file, GNSS manager 255 may provide the UID that corresponds to a given human-readable name to DFS 251. Further, when a file is no longer needed, GNSS manager 255 may delete the file from the map.

Figure 3:
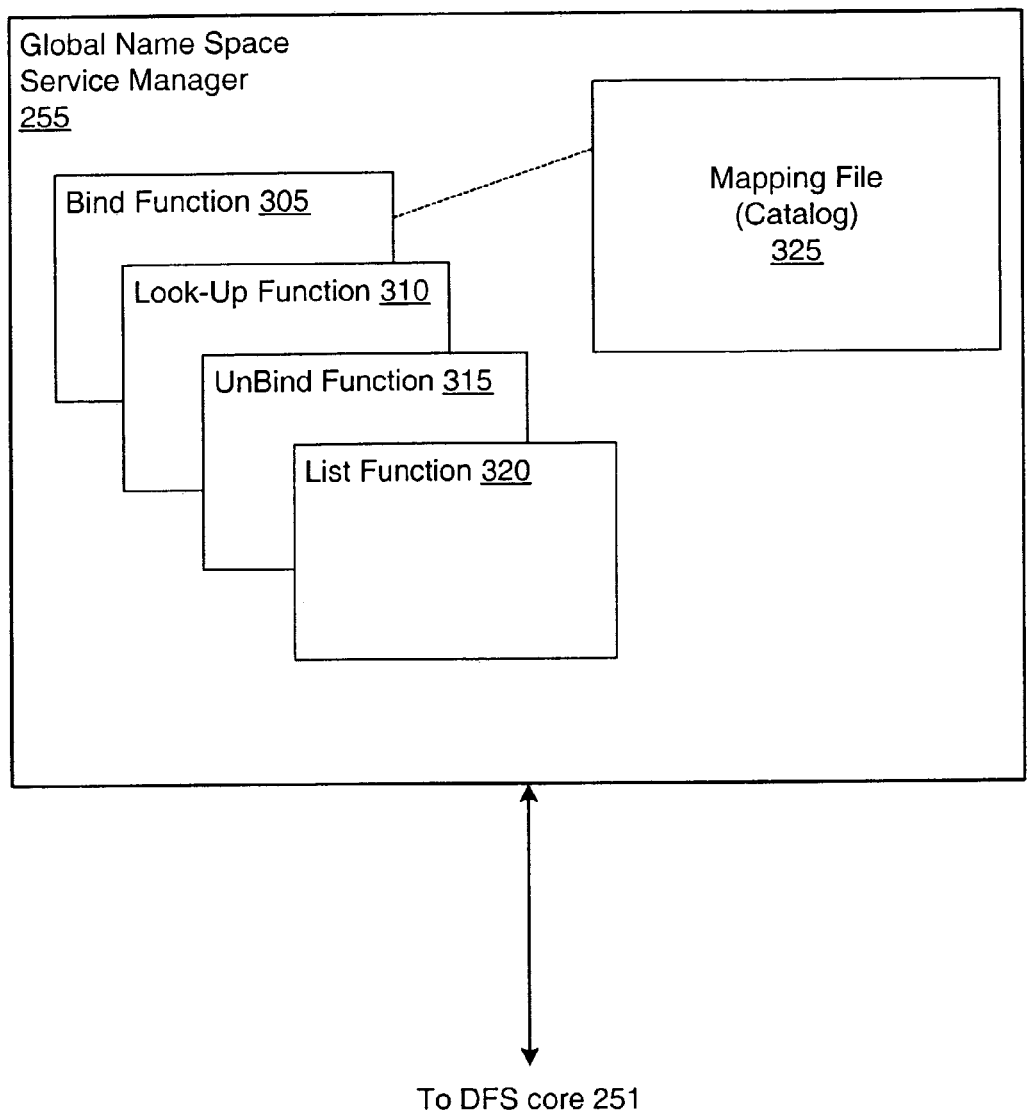
FIG. 3 is a diagram of one embodiment of a distributed file system of the node of FIG. 2.

Turning to FIG. 3, a diagram of one embodiment of a global name space service manager of a distributed file system is shown. Broadly speaking, global name space service (GNSS) manager 255 includes software components which when executed by a processor such as processor 220 of FIG. 2, may control the name space of the file system by implementing functionality to map a human-readable name of a file to that object's location-independent UID. In one embodiment GNSS manager 255 may implement this functionality using a bind function 305, a lookup function 310, an unbind function 315 and a list function 320.

Bind function 305 may implement functionality to create a mapping file which is referred to as catalog file 325. Catalog file 325 includes a data structure such as a table having one or more entries. Bind function 305 may receive a human-readable name such as a pathname, for example, and a UID from DFS core 251. Bind function 305 may bind the human-readable name to the UID creating a mapping between them. This mapping may be stored as an entry in the table. In one embodiment, catalog file 325 may also be a storage object. It is noted that catalog file 325 may be accessed concurrently on a single node (e.g., node 110A) or on multiple nodes (e.g., nodes 110A-110C). It is noted that in one embodiment, a default GNSS manager 255 may provide a naming service wherein the human-readable name is a pathname. However, in another embodiment, GNSS manager 255 may provide a naming service wherein the human-readable name is not necessarily a pathname.

In one embodiment, catalog file 325 may include table entries that are representative of either another catalog file or a file bound to a particular pathname. Since each human-readable name string in catalog file 325 may be a pathname including pathname components as described above, each pathname component may represent a catalog file.

Catalog file 325 may be stored in storage 240 of the node 110 on which it was created. In addition, replicas of any catalog file may be created and stored on any node. Each replica of catalog file 325 may be stored as a cache copy on a given node. To reduce the number of cache copies, a catalog file copy may be removed from a node. In one embodiment, a least recently used algorithm may be used to remove a cache copy of catalog file 325. In another embodiment, a timeout feature may cause a cached copy of catalog file 325 to be deleted after a predetermined amount of time has elapsed. It is noted that in one embodiment, if a catalog file is the last remaining copy in the system, it may not be removed. This type of file may be referred to as a repository of last resort.

In one embodiment, GNSS manager 255 may additionally store state information in a given catalog file at bind time to allow lookup function 310 to be performed later. Each such catalog file with GNSS state information can be accessed from any node 110. Consequently, each instance of GNSS manager 255 on each node may see the same state information, and may thus execute each of the functions (e.g., bind, unbind, lookup, etc) independently of the node it is executing on. Furthermore, the state information itself is location independent. Thus, after a pathname is bound to a UID by executing bind function 305 on some node, a lookup may then be performed on another node, supplying the same pathname, to look up the UID previously bound.

To support absolute pathnames, in one embodiment each node may know the UID of a root catalog file (not shown). Since every node may have this UID, a new node which joins network 100 may obtain this UID by exchanging a message with another node, for example. A first node may publish an initial (empty) root catalog, and thereby obtain the root catalog UID, since a UID may be returned by DFS core 251 whenever any file is published.

In one embodiment, lookup function 310 may implement functionality to receive a given human-readable name such as a pathname, for example, and return the UID corresponding to the given pathname. In one embodiment, lookup function 310 may be a recursive process of accessing each catalog file specified in each pathname component. To illustrate, a lookup of a given pathname of "/a/b/c" may include accessing the root catalog of distributed file system 250 by its root UID. The entry for 'a' may be found in the root catalog file. The 'a' entry indicates some corresponding UID 'a', which identifies a second catalog file. The entry for 'b' is found in that second catalog file, and this entry indicates some corresponding UID 'b', which identifies a final catalog file. The entry for 'c' is found in that final catalog file, and this entry is returned by lookup function 310, thus completing the lookup. It is noted that each of the catalog files containing each of the separate pathname components may be stored on different nodes or on the same node as desired.

In one embodiment, unbind function 315 may implement functionality to receive a given human-readable name such as a pathname, for example, and return the UID corresponding to the given pathname. In addition, unbind function 315 may disassociate the pathname from the UID by deleting the entry having the given pathname from the catalog file. As will be described further below, the UID corresponding to the deleted pathname, may be used during directory moves. It is noted that if after the specified entry is deleted, the catalog file has no more entries, the catalog file itself may be deleted. Also, when a catalog file is deleted recursively, its entry in the parent catalog (for the pathname being unbound) may be deleted.

In one embodiment, list function 320 may implement functionality to receive a given human-readable name such as a pathname, for example, and return a listing of each pathname component contained in the immediate specified pathname. More specifically, list function 320 may return a listing of the entries of the table within the catalog file corresponding to the UID of the specified pathname.

In one embodiment, GNSS manager 255 may provide support for directory moves. Even if bind function 305 is performed, specifying some pathname: $/p_0/p_1/p_2/\ldots/p_{n-1}/p_n$, all the functions (e.g., lookup, bind, and unbind) may also operate on a sub-path: $/p_0/p_1/p_2/\ldots/p_{j-1}/p_j$, where j<n. This support of sub-paths may make it possible for distributed file system 250 to perform efficient directory moves, without needing to perform individual unbind and bind functions for every possible pathname that includes the sub-path.

For example, in a directory move of $/p_0/p_1/p_2/\ldots/p_{j-1}/p_j$ to $/q_0/q_1/q_2/\ldots/q_{k-1}/q_k$. First, unbind function 315 is performed on $/p_0/p_1/p_2/\ldots/p_{j-1}/p_j$. This unbind call returns some UID, g. Then bind function 305 is performed, specifying a path of $/q_0/q_1/q_2/\ldots/q_{k-1}/q_k$ and the UID, g. Once this bind has been performed, it should be possible to look up the pathname: $/q_0/q_1/q_2/\ldots/q_{k-1}/q_k/p_{j+1}/\ldots/p_{n-1}/p_n$, and get the same UID as would have been returned for a look up of the original pathname before the directory move: $/p_0/p_1/p_2/\ldots/p_{n-1}/p_n$.

In one embodiment, during a bind operation, bind function 305 may initiate a lookup prior to performing the mapping as described above. For example, when provided with a pathname $/p_0/p_1/p_2/\ldots/p_{n-1}/p_n$, bind function 305 may first attempt to look up the catalog file corresponding to $/p_0/p_1/p_2/\ldots/p_{n-1}$. This lookup attempt may fail since there may be no entry for some $p_{i+1}$ in the catalog file corresponding to $p_i$. To handle this failure, an empty catalog file may be published corresponding to $p_{i+1}$, and this publish call returns some UID, g, for that just-published catalog. Then, an entry in the catalog file corresponding to $p_i$ is made for $p_{i+1}$, such that this entry's corresponding UID is g. Adding this entry to the catalog file corrects the failure. This failure recovery continues until the catalog file corresponding to $p_{n-2}$ gets a new entry for $p_{n-1}$.

Whether or not the above failure handling needed to be done first, eventually, it becomes possible to look up the catalog file corresponding to /$p_0$/$p_1$/$p_2$/ . . . /$p_{n-1}$. If that catalog file already has an entry for $p_n$, bind function 305 may return a failure. Otherwise, an entry for $p_n$ may be created which indicates the corresponding UID, G, specified to the bind function 305.

It is be noted that this automatic creation of intervening catalogs may be different from the corresponding practice with some typical file systems. For example, in a typical file system, creating a file may generate a fail if the parent directories have not yet been created. One reason for automatic creation of catalog files during a bind operation may be to ensure that the semantics of bind function 305 for a default hierarchical GNSS manager 255 may be the same as the semantics of a general GNSS bind function, where the name may not necessarily be a pathname.

Figure 4:
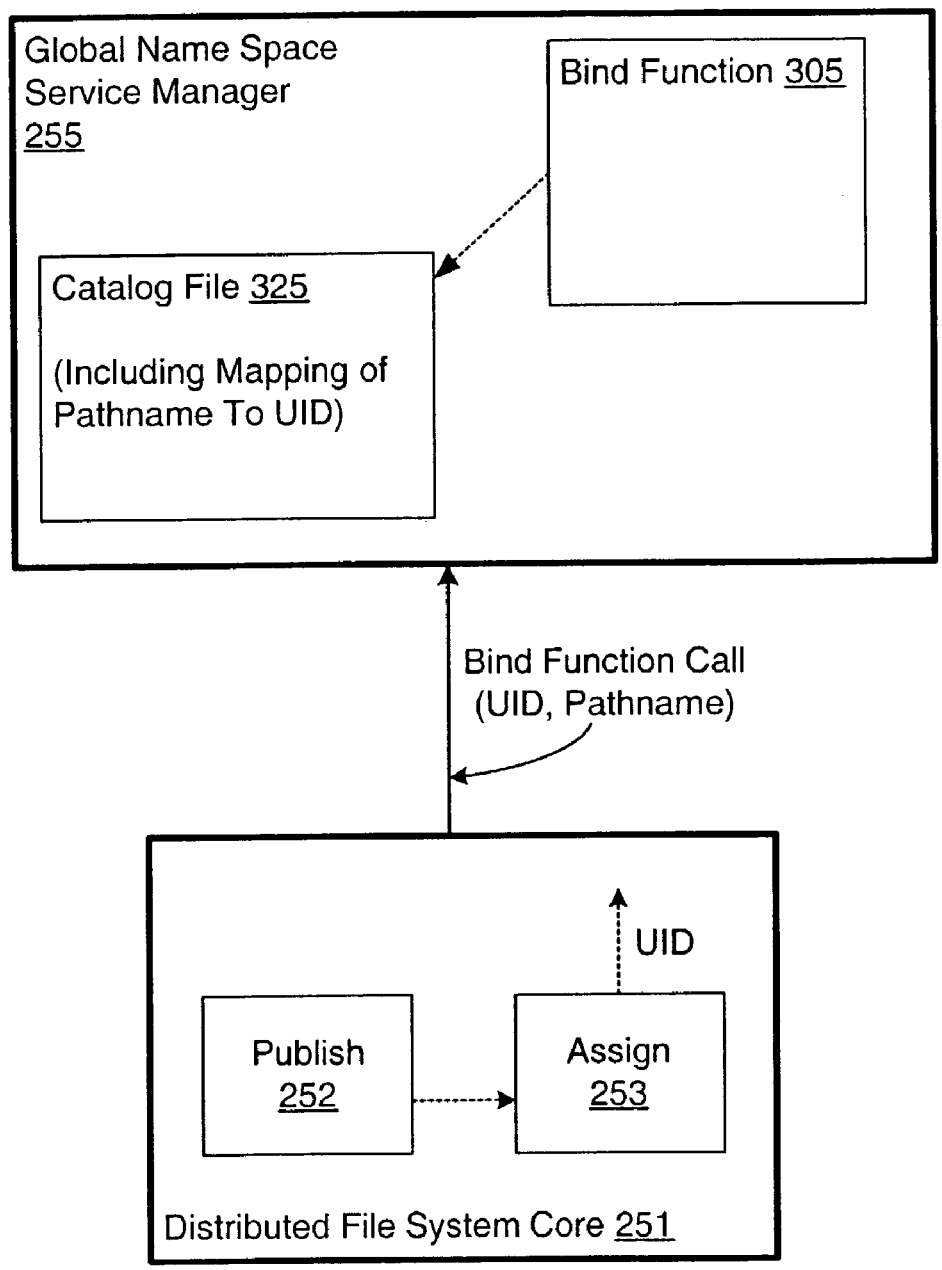
FIG. 4 is a functional diagram illustrating one embodiment of a bind function call of a distributed file system.

To further illustrate the functionality of the functions of GNSS manager 255, FIG. 4 through FIG. 7, illustrate functional diagrams of the interaction between one embodiment GNSS manager 255 and DFS core 251 of FIG. 2. Turning now to FIG. 4, a functional diagram illustrating one embodiment of a bind function call of a distributed file system is shown. Components corresponding those shown in previous drawings are numbered identically for simplicity and clarity. As described above, in one embodiment, an internal publish function 252 of DFS core 251 may publish a file for storage. DFS core 251 may assign a file system unique identifier UID to the file using another internal function (e.g., assign function 252). It is noted that in other embodiments, DFS core may create a storage object corresponding to the file, in which case the UID may correspond to the storage object.

DFS core 251 may make a bind function call to GNSS manager 255. The bind function call may include a pathname and the corresponding UID of the file. In response to the function call, GNSS manager 255 executes bind function 305. The bind function creates a mapping between the pathname and the UID. This mapping may be stored in a catalog file 325 as an entry in a table (not shown). As described above, this catalog file 325 may reside on the node which created it or it may reside on any other node. In either case, catalog file 325 may be accessed by any node.

Figure 5:
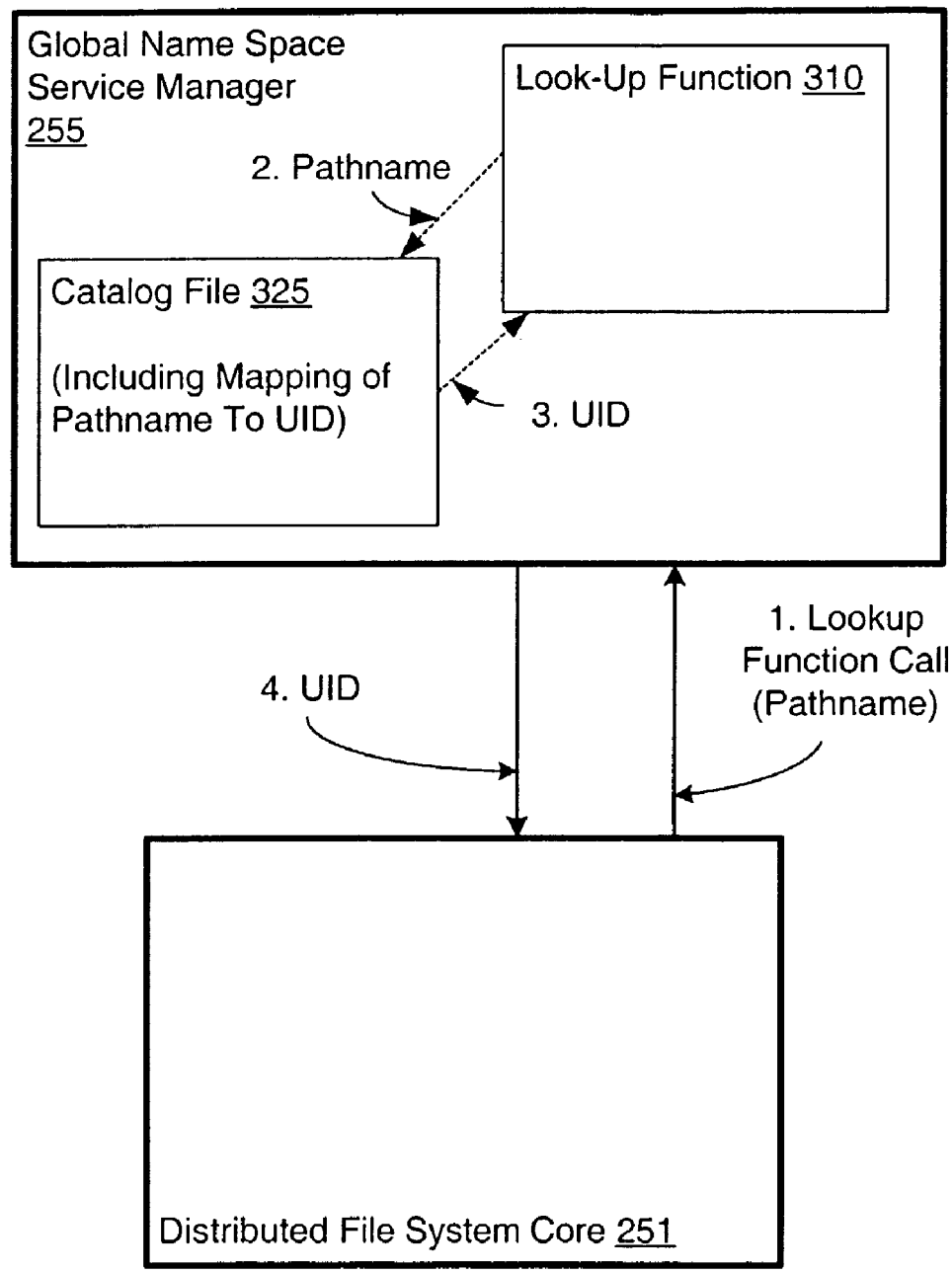
FIG. 5 is a functional diagram illustrating one embodiment of a lookup function call of a distributed file system.

Referring to FIG. 5, a functional diagram illustrating one embodiment of a lookup function call of a distributed file system on a single node is shown. Components corresponding those shown in previous drawings are numbered identically for simplicity and clarity. In one embodiment, in a first step DFS core 251 may make a lookup function call to GNSS manager 255. The lookup function call may include pathname. In response to the lookup function call, GNSS manager 255 executes the lookup function 310. In a second step, lookup function 310 may access an entry within catalog file 325 using the received pathname. Lookup function 310 retrieves the UID corresponding to the pathname component in catalog file 325 in a third step. GNSS manager 255 then passes the UID to DFS core 251 in a fourth step.

Figure 6:
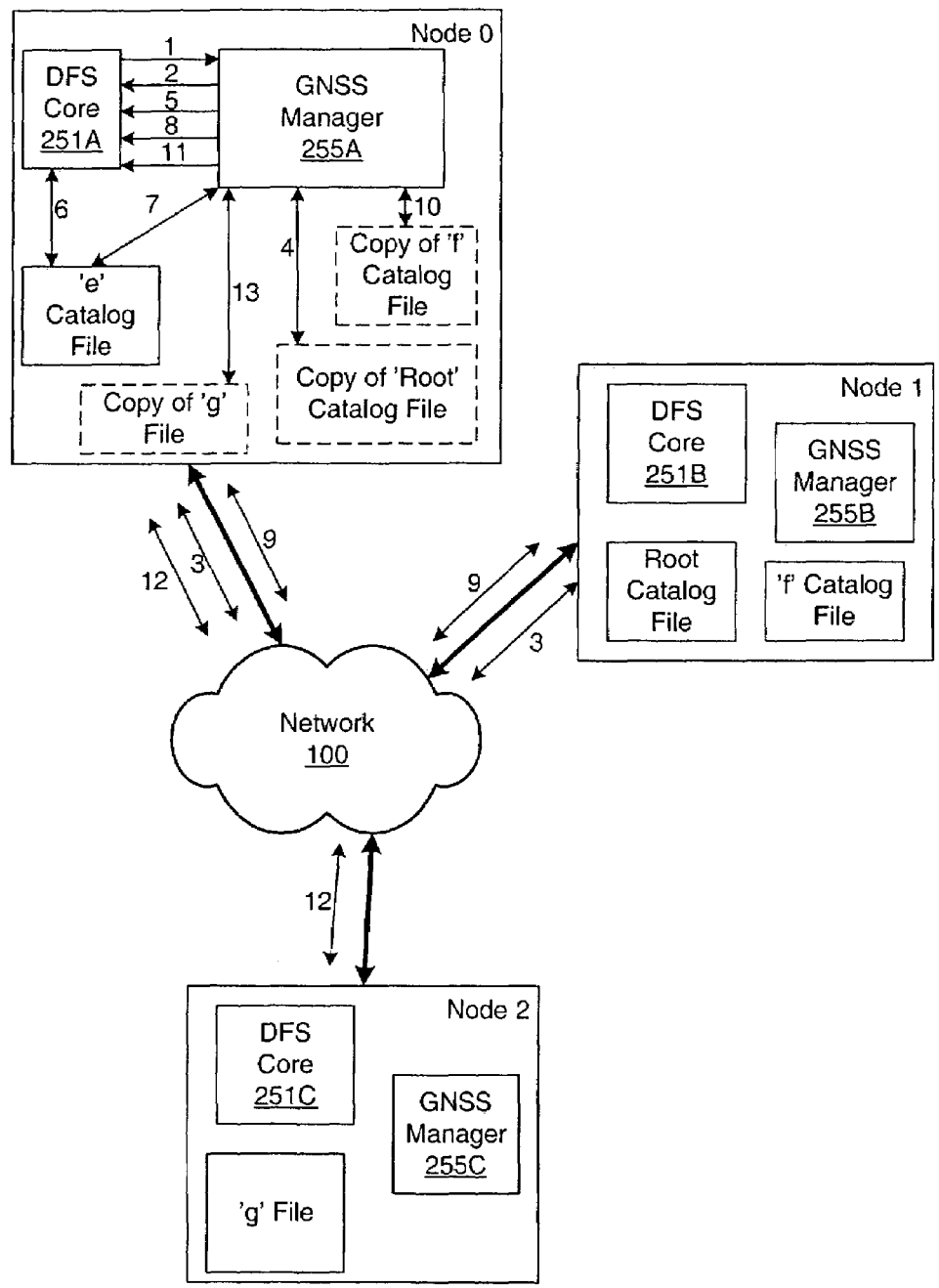
FIG. 6 is a functional diagram illustrating another embodiment of a lookup function call of a distributed file system.

Turning to FIG. 6, a functional diagram illustrating another embodiment of a lookup function call of a distributed file system on multiple nodes is shown. Components corresponding those shown in previous drawings are numbered identically for simplicity and clarity. The network 100 includes three nodes designated 0-3. Each node includes functionality as previously described in FIG. 1-FIG. 5. FIG. 6 is intended to illustrate the distributed nature of the name space service. In the illustrated embodiment, Node 0 initiates a lookup function call for a file having the pathname '/e/f/g'. The root catalog file is initially located on node 1. The 'e' catalog file is initially located on Node 2, the 'f' catalog file is initially located on Node 1 and the file 'g' is initially located on Node 0. Each of the numbered arrows corresponds to a step described below.

In one embodiment, each node knows the UID of the root catalog file. DFS core 251A of Node 0 may make a lookup function call to GNSS manager 255A of Node 0 (step 1). The lookup function call may include pathname '/e/f/g'. In response to the lookup function call, GNSS manager 255A returns the UID of the root catalog (step 2). DFS core 251A finds and retrieves a copy of the root catalog file from Node 1 (denoted by the dashed lines) (step 3). Using the lookup function, GNSS manager 255A may access and retrieve the UID corresponding to the entry for the 'e' catalog file within the root catalog file using the received pathname (step 4). GNSS manager 255A then passes the UID for the 'e' catalog file to DFS core 251A (step 5). DFS core 251A finds the 'e' catalog file stored within Node 0 (step 6). Since this is only the first component of the pathname, using the lookup function, GNSS manager 255A accesses and retrieves the UID corresponding to the entry for the 'f' catalog within the 'e' catalog file (step 7). GNSS manager 255A then passes the UID for the 'f' catalog file to DFS core 251A (step 8). DFS core 251A finds and retrieves a copy of the 'f' catalog file stored within Node 1 (denoted by the dashed lines) (step 9). Since this is only the second component of the pathname, using the lookup function, GNSS manager 255A accesses and retrieves the UID corresponding to the entry for the 'g' file within the 'f' catalog file (step 10). GNSS manager 255A then passes the UID for the 'g' file to DFS core 251A (step 1). DFS core 251A finds and retrieves a copy of the 'g' file stored within Node 2 (denoted by the dashed lines) (step 12). Since the 'g' file is the target file, the lookup function is complete and the copy of the 'g' may be accessed as desired (step 13).

It is noted that although the lookup function was initiated on Node 0, any node may initiate the lookup. The distributed nature of the global name space service may allow any instance of the global name space service on any node to perform the functions described above.

Figure 7:
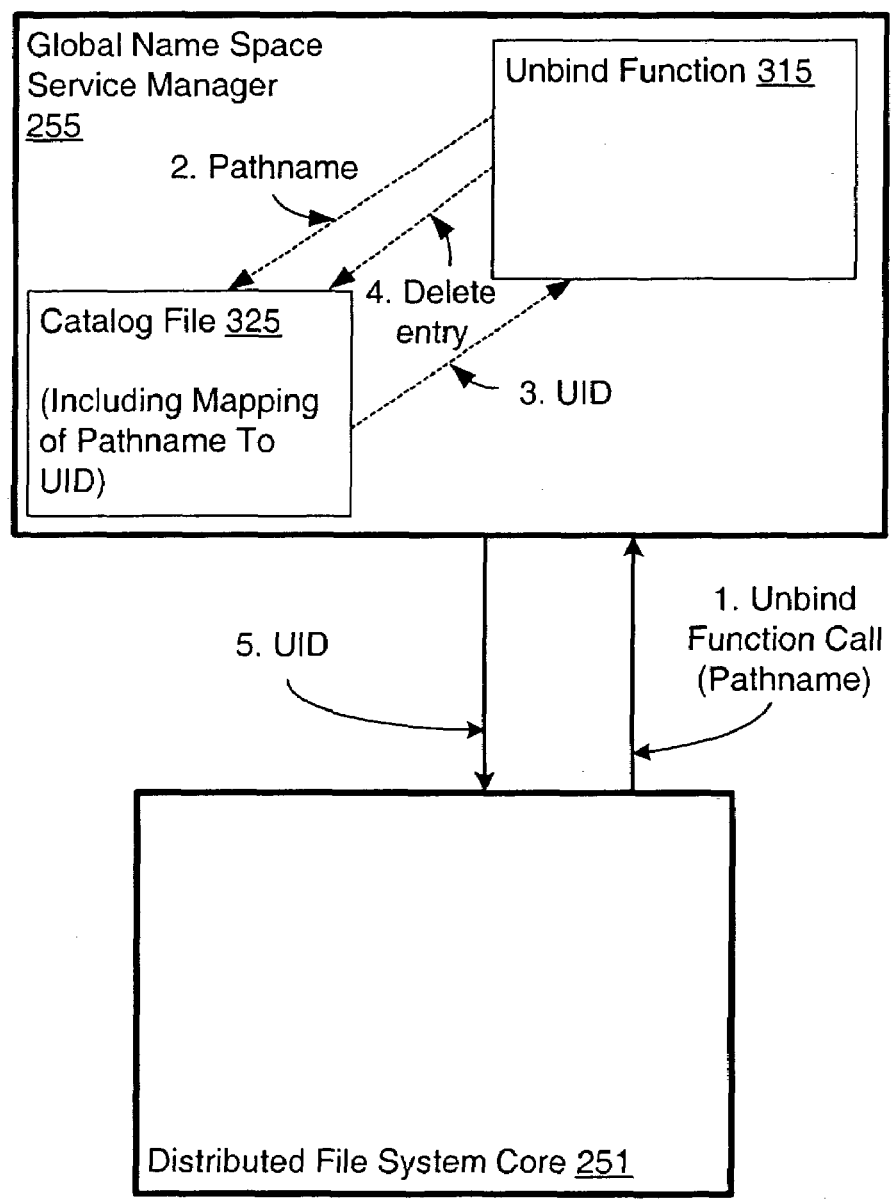
FIG. 7 is a functional diagram illustrating one embodiment of an unbind function call of a distributed file system.

Referring to FIG. 7, a functional diagram illustrating one embodiment of an unbind function call of a distributed file system is shown. Components corresponding to those shown in previous drawings are numbered identically for simplicity and clarity. In one embodiment, in a first step DFS core 251 may make an unbind function call to GNSS manager 255. The unbind function call may include pathname. In response to the unbind function call, GNSS manager 255 executes the unbind function 315. In a second step, unbind function 315 may access an entry within catalog file 325 using the received pathname. Unbind function 315 retrieves the UID corresponding to the pathname component in catalog file 325 in a third step. Unbind function 315 may delete the entry including the received pathname in a fourth step. GNSS manager 255 then passes the UID to DFS core 251 in a fifth step.

It is noted that the steps described above in conjunction with the descriptions of FIG. 5 and FIG. 7 are numbered for discussion purposes only and that in alternative embodiments the steps may numbered differently.

It is also noted that various embodiments may further include receiving, sending or storing instructions and/or data implemented in accordance with the foregoing description upon a carrier medium, such as a computer readable storage medium and/or transmission media or signals. Generally speaking, a the computer readable storage medium may include storage media or memory media such as magnetic or optical media, e.g., disk or CD-ROM, volatile or non-volatile media such as RAM (e.g., SDRAM, DDR SDRAM, RDRAM, SRAM, etc.), ROM, etc. The transmission media or signals include signals, such as electrical, electromagnetic, or digital signals, conveyed via a communication medium, such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer implemented method for implementing a global name space service for a distributed file system, said method comprising:
   receiving a file system unique identifier corresponding to a particular file;
   receiving a human-readable name corresponding to said particular file;
   binding said human-readable name to said file system unique identifier;
   wherein said binding creates a mapping between said human-readable name and said file system unique identifier; and
   creating a mapping file including a table having a plurality of entries, each including a given human-readable name and a file system unique identifier corresponding to said given human-readable name;
   wherein said given human-readable name comprises a pathname; and
   wherein in response to receiving a given pathname including one or more pathname components:
   accessing a first mapping file using a computer, wherein the first mapping file corresponds to a root component of said pathname, wherein the first mapping file provides a first file system unique identifier corresponding to a first component of said pathname and wherein the first mapping file is organized in a hierarchy based upon a first set of one or more possible components of the pathname; and
   accessing a second mapping file using a computer, wherein the second mapping file corresponds to said first component of said pathname using said first file system unique identifier, wherein the second mapping file provides a second file system unique identifier corresponding to a second component of said pathname and wherein the second mapping file is organized in a hierarchy based upon a second set of one or more possible components of the pathname.

2. The method as recited in claim 1 further comprising in response to receiving said given human-readable name, accessing said mapping file and providing said corresponding file system unique identifier.

3. The method as recited in claim 1 further comprising in response to receiving said given human-readable name, accessing said mapping file and returning said corresponding file system unique identifier and deleting said entry including said given human-readable name.

4. The method as recited in claim 1, wherein said given human-readable name is a pathname.

5. The method as recited in claim 4 further comprising in response to receiving a given pathname, accessing said mapping file and returning a list of components, wherein each of said components is an entry in said table.

6. A storage media comprising executable instructions that, when executed by a processor, cause the processor to perform a method comprising:
   receiving a file system unique identifier corresponding to a particular file;
   receiving a human-readable name corresponding to said particular file;
   binding said human-readable name to said file system unique identifier;
   wherein said binding creates a mapping between said human-readable name and said file system unique identifier; and
   creating a mapping file including a table having a plurality of entries, each including a given human-readable name and a file system unique identifier corresponding to said given human-readable name;
   wherein said given human-readable name comprises a pathname; and
   wherein in response to receiving a given pathname including one or more pathname components:
   accessing a first mapping file corresponding to a root component of said pathname, wherein the first mapping file provides a first file system unique identifier corresponding to a first component of said pathname and wherein the first mapping file is organized in a hierarchy based upon a first set of one or more possible components of the pathname; and
   accessing a second mapping file corresponding to said first component of said pathname using said first file system unique identifier, wherein the second mapping file provides a second file system unique identifier corresponding to a second component of said pathname and wherein the second mapping file is organized in a hierarchy based upon a second set of one or more possible components of the pathname.

7. The storage media as recited in claim 6, wherein said method further comprising in response to receiving said given human readable name, accessing said mapping file and providing said corresponding file system unique identifier.

8. The storage media as recited in claim 6, wherein said method further comprising in response to receiving said given human readable name, accessing said mapping file and returning said corresponding file system unique identifier and deleting said entry including said given human-readable name.

9. The storage media as recited in claim 6, wherein said given human-readable name is a pathname.

10. The storage media as recited in claim 9, wherein said method further comprising in response to receiving a given pathname, accessing said mapping file and returning a list of components, wherein each of said components is an entry in said table.

11. A system comprising:
    a plurality of nodes interconnected via a network, wherein each of said nodes includes:
    a processor configured to execute program instructions;
    a memory coupled to said processor, said memory including said program instructions executable to implement a method of:
    receiving a file system unique identifier corresponding to a particular file;
    receiving a human-readable name corresponding to said particular file; and
    binding said human-readable name to said file system unique identifier;
    wherein said binding creates a mapping between said human-readable name and said file system unique identifier; and
    wherein said mapping includes a mapping file including a table having a plurality of entries, each including a given human-readable name and a file system unique identifier corresponding to said given human-readable name;

wherein said given human-readable name comprises a pathname; and wherein in response to receiving a given pathname including one or more pathname components:

accessing a first mapping file corresponding to a root component of said pathname, wherein the first mapping file provides a first file system unique identifier corresponding to a first component of said pathname and wherein the first mapping file is organized in a hierarchy based upon a first set of one or more possible components of the pathname; and accessing a second mapping file corresponding to said first component of said pathname using said first file system unique identifier, wherein the second mapping file provides a second file system unique identifier corresponding to a second component of said pathname and wherein the second mapping file is organized in a hierarchy based upon a second set of one or more possible components of the pathname.

12. A system comprising:

a plurality of nodes interconnected via a network, wherein each of said nodes includes:

a processor configured to execute program instructions;

a memory coupled to said processor and configured to store said program instructions;

a global name space service manager coupled to said processor and configured to:

receive a file system unique identifier corresponding to a particular file;

receive a human-readable name corresponding to said particular file;

bind said human-readable name to said file system unique identifier and create a mapping between said human-readable name and said file system unique identifier; and create a mapping file including a table having a plurality of entries, each including a given human-readable name and a file system unique identifier corresponding to said given human-readable name;

wherein said given human-readable name comprises a pathname; and wherein in response to receiving a given pathname including one or more pathname components, said global name space service manager is further configured to:

access a first mapping file corresponding to a root component of said pathname, wherein the first mapping file provides a first file system unique identifier corresponding to a first component of said pathname and wherein the first mapping file is organized in a hierarchy based upon a first set of one or more possible components of the pathname; and access a second mapping file corresponding to said first component of said pathname using said first file system unique identifier, wherein the second mapping file provides a second file system unique identifier corresponding to a second component of said pathname and wherein the second mapping file is organized in a hierarchy based upon a second set of one or more possible components of the pathname.

13. The system as recited in claim 12, wherein said global name space service manager is further configured to access said mapping file and to provide said corresponding file system unique identifier in response to receiving said given human-readable name.

14. The system as recited in claim 12, wherein said global name space service manager is further configured to access said mapping file, to return said corresponding file system unique identifier and to delete said entry including said given human-readable name in response to receiving said given human-readable name.

15. The system as recited in claim 12, wherein said global name space service manager of a given node is further configured to replicate and store on said given node a mapping file created on another node.

16. The system as recited in claim 15, wherein said global name space service manager of said given node is further configured to delete said replicated mapping file in response to a mapping file replacement timeout.

17. A system comprising:

a plurality of nodes interconnected via a network, wherein each of said nodes includes:

a processor configured to execute program instructions;

a memory coupled to said processor and configured to store said program instructions;

means for receiving a file system unique identifier corresponding to a particular file;

means for receiving a human-readable name corresponding to said particular file; and means for binding said human-readable name to said file system unique identifier;

wherein said binding creates a mapping between said human-readable name and said file system unique identifier; and wherein said mapping includes a mapping file including a table having a plurality of entries, each including a given human-readable name and a file system unique identifier corresponding to said given human-readable name;

wherein said given human-readable name comprises a pathname; and wherein in response to receiving a given pathname including one or more pathname components:

accessing a first mapping file corresponding to a root component of said pathname, wherein the first mapping file provides a first file system unique identifier corresponding to a first component of said pathname and wherein the first mapping file is organized in a hierarchy based upon a first set of one or more possible components of a pathname; and accessing a second mapping file corresponding to said first component of said pathname using said first file system unique identifier, wherein the second mapping file provides a second file system unique identifier corresponding to a second component of said pathname and wherein the second mapping file is organized in a hierarchy based upon a second set of one or more possible components of the pathname.

\* \* \* \* \*